(12) United States Patent
Mancina et al.

(10) Patent No.: US 9,506,488 B2
(45) Date of Patent: *Nov. 29, 2016

(54) CLAMP ASSEMBLY FOR MOUNTING PANELS TO I-BEAMS

(71) Applicants: Joseph Mancina, Oakville (CA); James D. Haws, Oakville (CA); Miroslav Vukovic, Oakville (CA); Andriy N. Prokudin, Oakville (CA)

(72) Inventors: Joseph Mancina, Oakville (CA); James D. Haws, Oakville (CA); Miroslav Vukovic, Oakville (CA); Andriy N. Prokudin, Oakville (CA)

(73) Assignee: LAYDO COMPOSITES LTD., Oakville, Ontario (CA)

( * ) Notice: Subject to any disclaimer, the term of this patent is extended or adjusted under 35 U.S.C. 154(b) by 332 days.

This patent is subject to a terminal disclaimer.

(21) Appl. No.: 14/083,472

(22) Filed: Nov. 19, 2013

(65) Prior Publication Data

US 2014/0072364 A1    Mar. 13, 2014

Related U.S. Application Data

(63) Continuation of application No. 13/342,270, filed on Jan. 3, 2012, now Pat. No. 8,608,122.

(60) Provisional application No. 61/444,514, filed on Feb. 18, 2011.

(51) Int. Cl.
| | |
|---|---|
| *A47B 96/06* | (2006.01) |
| *E04G 3/00* | (2006.01) |
| *F16B 1/00* | (2006.01) |
| *G09F 7/18* | (2006.01) |
| *B62D 35/00* | (2006.01) |
| *F16B 9/02* | (2006.01) |

(Continued)

(52) U.S. Cl.
CPC ............ *F16B 9/023* (2013.01); *B62D 35/001* (2013.01); *F16B 2/14* (2013.01); *B62D 35/00* (2013.01); *B62D 37/02* (2013.01); *F16M 13/022* (2013.01); *Y10S 180/903* (2013.01); *Y10T 403/3906* (2015.01)

(58) Field of Classification Search
CPC .. F16M 13/02; F16M 13/027; F16M 13/022; A47F 5/0006; F21V 21/048; B62D 35/001; B62D 35/00; B62D 37/02; Y10S 180/903
USPC ................ 248/228.6, 228.1, 229.15, 229.25, 248/231.71, 317, 323, 214; 296/180.1, 296/180.2, 180.4, 29; 104/89, 111; 52/474, 52/484, 506.07, 506.6, 238.1; 24/545, 24/569; 403/374.1–374.4
See application file for complete search history.

(56) References Cited

U.S. PATENT DOCUMENTS

| | | |
|---|---|---|
| 1,281,531 A | 10/1918 | Dietrich |
| 1,658,956 A | 2/1928 | Wehr |

(Continued)

*Primary Examiner* — Brian Mattei
*Assistant Examiner* — Taylor Morris
(74) *Attorney, Agent, or Firm* — Jeffrey S. Melcher; Manelli Selter PLLC

(57) ABSTRACT

A clamp assembly is provided for securing a panel or fairing to an I-beam, and comprises a pair of side blocks and a clamping block, together with a single bolt to secure them in place. Each of the side blocks as an inclined wedge surface, and the T-shaped clamping block has similarly sloped wedge surfaces along the sides of the leg of the T. When a bolt this passed through side legs of the side blocks, and through or under the clamping block, a sliding and wedging action between the inclined and sloped wedge surfaces occurs. Moreover, a clamping action between the top surface of the clamping block and the lower surface of the lower flanges of the I-beam is also induced.

24 Claims, 12 Drawing Sheets

(51) Int. Cl.
*F16B 2/14* (2006.01)
*A47H 1/10* (2006.01)
*B62D 37/02* (2006.01)
*F16M 13/02* (2006.01)

(56) References Cited

U.S. PATENT DOCUMENTS

| | | | |
|---|---|---|---|
| RE17,629 E | 3/1930 | Wehr | |
| 1,768,543 A * | 7/1930 | Clausing | E04B 9/18 248/228.3 |
| 2,049,893 A * | 8/1936 | Chicoine | E04G 5/04 182/187 |
| 3,465,995 A * | 9/1969 | Whitman | B25B 5/08 248/228.3 |
| 5,794,897 A * | 8/1998 | Jobin | H02G 7/053 24/459 |
| 6,171,540 B1 | 1/2001 | Ibaragi | |
| 7,748,772 B2 | 7/2010 | Boivin | |
| 7,887,120 B2 | 2/2011 | Boivin | |
| 7,938,475 B2 | 5/2011 | Boivin | |
| 7,942,467 B2 | 5/2011 | Boivin | |
| 7,942,468 B2 | 5/2011 | Boivin | |
| 7,942,469 B2 | 5/2011 | Boivin | |
| 7,942,470 B2 | 5/2011 | Boivin | |
| 7,942,471 B2 | 5/2011 | Boivin | |
| D649,090 S | 11/2011 | Boivin | |
| 2009/0218848 A1 | 9/2009 | Boivin | |
| 2010/0096881 A1 | 4/2010 | Boivin | |
| 2010/0096882 A1 | 4/2010 | Boivin | |
| 2010/0264690 A1 | 10/2010 | Brown | |
| 2010/0264691 A1 | 10/2010 | Giromini | |

* cited by examiner

CLAMP ASSEMBLY FOR MOUNTING PANELS TO I-BEAMS

FIELD OF THE INVENTION

This invention relates to clamp assemblies, and particularly to clamp assemblies whose purpose is to secure a panel so that it subtends from an I-beam. In a particular use and embodiment of the present invention, a plurality of clamp assemblies is employed to secure a cargo trailer fairing to each side of a cargo trailer beneath the floor thereof, so as to improve the aerodynamic properties of the cargo trailer, and thereby improve the fuel consumption of the road tractor which is towing the cargo trailer. A particular feature of the present invention is that it permits the installation of trailer fairings to cargo trailers with the expenditure of minimal labour and/or minimal time.

BACKGROUND OF THE INVENTION

The purposes of the present invention are manifold. In the first instance, the present invention provides a novel means for securing panels of various sorts, to I-beams, and typically, to the ends of I-beams. Such securement may, for example, be in respect of various items, such as display panels and the like which are mounted to store fronts, and so on. However, the present invention was primarily developed so as to mount trailer fairings at the sides of cargo trailers, and thereby improve the aerodynamic characteristics of the cargo trailers to which the trailer fairings are mounted. A particular feature of the present invention however, is that it permits the securement of a trailer fairing at each side of a cargo trailer using minimal time, minimal number and types of components, and using minimal labour. As a result, the efficiency of the installation process is improved, and the costs of such an operation are decreased. It will be appreciated that such savings can be quite substantial, particularly in cases where a fleet of cargo trailers is to be modified to include trailer fairings. In such cases, the number of cargo trailers may be in the tens, hundreds, or even thousands of units.

As background, the benefits of improving the aerodynamic characteristics of cargo trailers are well known. However, some of such benefits are worthy of being mentioned at this time. They include the fact that it has been shown that the aerodynamic performance of a cargo trailer having trailer fairings mounted thereon, may be such as to permit fuel savings for the road tractor towing such an enhanced cargo trailer by up to 6.5%. Indeed, the Environmental Protection Agency (EPA) has established standards according to which it will grant the manufacturer of trailer fairings the right to advise its customers, and the public, that the trailer fairings are "EPA Smartway compliant".

Moreover, trailer fairings of the sort that are contemplated by the present invention for mounting to cargo trailers using the clamp assembly disclosed herein, are modular in design and construction so that a given number of trailer fairings panels, which are generally all alike one to another, may be easily mounted or secured to a cargo trailer. Typically, depending on the length of the cargo trailer and the placement of the wheel bogies thereunder, a single sheet of fairing material is used on each side of the trailer. However, in a modular design, up to five to ten, or more, modular panels (which may be interconnected) may be employed, per side of the trailer.

Further, the clamp assembly is readily and easily installed on new trailers, but can be easily retrofitted to older trailers, and the like. As such, it will also be understood, of course, that the clamp assemblies of the present invention may be employed in their particularly intended use with cargo trailers of any age, new or old.

As will become apparent hereafter, employment of the clamp assembly of the present invention absolutely precludes the necessity for drilling or welding of any sort when mounting any panel whatsoever to the end of an I-beam. This is particularly important in the intended use of the clamp assembly of the present invention when mounting trailer fairings to cargo trailers, because considerable time and labour costs are saved, and because the integrity of the I-beams to which the trailer fairings are attached is not compromised in any manner whatsoever.

Still further, it will become evident that it is a simple matter to use the clamping assembly of the present invention to replace a sheet fairing or any one of a series of modular panels forming a trailer fairing, in the event of damage or for other reasons. This can also include replacement of any prior art clamp assemblies which secure the sheet or modular fairing panels to a cargo trailer, without the necessity of having to do any significant work on any adjacent clamps and/or modular panels.

It will also be understood that not only should the materials from which the clamp assemblies to secure trailer fairings to cargo trailers, but the material of the trailer fairings themselves, must at the same time embody the characteristics of rigidity and yet, in respect of the modular panels of a trailer fairing, they must have a certain amount of flexibility. The rigidity of the clamp assembly in keeping with the present invention comes as a matter of design and the employment of a ribbed structure as is well known to those skilled in the art. Likewise, rigidity and yet flexibility of modular panels of a trailer fairing, comes as a consequence of the employment of a suitable material of a suitable thickness, as is well-known to those skilled in the art, optionally together with the employment of a suitable brace or strut as will also become apparent hereafter.

DESCRIPTION OF THE PRIOR ART

The prior art to be discussed herein includes a discussion of a prior mounting assembly for trailer fairings as has been employed by the assignee of the present invention. Another item of known prior art that will be discussed hereafter is found in a published United States patent application. One very profound benefit of the present invention will be noted, is that the mounting of the clamp assembly to an I-beam, in keeping with the present invention, can employ as little as only a single bolt to hold the clamp to the I-beam; whereas the prior art methods of mounting clamp assemblies to the end of an I-beam so as to secure trailer fairing thereto required the employment of at least four or more bolts. Although additional bolts can be utilized (e.g. 2 or 3 bolts per mounting clamp), typically only 1 or 2 bolts are required.

As will be seen hereafter in a more detailed discussion of FIGS. 1 and 2, the manner of mounting trailer fairings at the ends of I-beams on the underside of cargo trailers has required the careful placement of a plurality of structures, each of which comprises two plates, four bolts, and the end of the I-beam, and the attachment of an additional two bolts at the bottom of the trailer fairing. Placement of each such assembly takes a considerable amount of time, involves handling a not inconsiderable weight, and may indeed require the services of not one but two skilled mechanics. Obviously, the cost of such labour can be considerable, as well as the time taken.

U.S. Pat. Re. 17,629, issued Mar. 25, 1930 to Wehr, describes a clamp whose purpose is to suspend hangers which are employed in association with flanged I-beams for suspending tracks for overhead carriers. The particular feature of the patented design is that it permits suspension of a hanger bolt from the angled, non-flat, bottom flanges of an I-beam by means of clips which fit over the ends of a hanger bar and which are secured to the bottom flanges of an I-beam by the action of an inclined sliding wedge formed between the clips and the ends of the hanger bar. The design of the I-beam clamp is such that it permits clamping of the hanger bars to flanged I-beams having differing sizes. It should be noted, however, that the particular purpose of this device is to suspend hangers for an overhead carrier, where the hangers may be subject to considerable swaying, as well as creeping along the length of the I-beam. It is apparent that the suspended hangers must be positioned at the centre of the bottom flanges of the I-beam, that is to say below the web of the I-beam.

Published United States Patent Application 2010/0096881, published Apr. 22, 2010 in the name of Boivin et al, describes an aerodynamic skirt wheel interface. What is particularly described is an assembly by which trailer skirts of rigid material may be mounted to both sides of a road trailer for the purpose of managing the flow of air around and underneath the trailer. A particular concern is the fact that the brackets which hold the skirts may be put under significant stress and thereby be required to be resilient. The publication describes a resilient strut which is made of a resilient material adapted to sustain significant deformation and yet is adapted to resiliently regain its original position. The strut supports are made of non-metallic materials. The publication states that the fastening system employed uses a limited number of parts to reduce the assembly time and the weight added to the trailer (see paragraph 0018). However, a further review of FIGS. 8 and 9 of the publication, and of paragraphs 0077 and 0078, reveals that the strut is mounted to the lower flanges of an I-beam by four bolts or rivets passing through openings which are formed in the lower flanges of the I-beams. This can be time consuming.

To overcome these difficulties, it would be advantageous to provide a panel clamping assembly which can be easily and rapidly installed on a wide variety of I-beams, and which is adaptable to be fitted to I-beams of variety sizes.

SUMMARY OF THE INVENTION

The advantages set out hereinabove, as well as other objects and goals inherent thereto, are at least partially or fully provided by the clamping assembly of the present invention, as set out herein below.

In accordance with one aspect of the present invention, there is provided a clamp assembly for securing a panel to an I-beam so that the plane of the panel and the longitudinal axis of the I-beam are substantially perpendicular one to the other, and wherein the clamp is secured to a freely accessible pair of opposed flanges of the I-beam above the bottom surface thereof. The clamp assembly comprises a pair of side blocks each being generally in the shape of an inverted "L", and each having an upper and outer side surface, and end surfaces, all in mutually perpendicular relationship. A bottom surface is parallel to the upper surface, and a lower clamping surface is parallel to the upper surface. There is an inclined wedge surface extending downwardly and outwardly from its intersection with the lower clamping surface to its intersection with the bottom surface. The clamp assembly further comprises a single clamping block generally in the shape of a "T", and having an upper surface, an outer surface across the head of the "T" and perpendicular to the upper surface, an inner surface at the foot of the "T" and perpendicular to the upper surface, a bottom surface of the leg of the "T" parallel to the upper surface thereof, and a pair of sloping wedge surfaces along the sides of the leg of the "T". Each of the sloping wedge surfaces slopes downwardly and inwardly along at least a portion of the length of the leg of the "T" from its respective intersection with the upper surface of the clamping block to a respective intersection with the bottom surface thereof. Preferably, a single bolt of sufficient length that it is longer than the width of the bottom surface of the I-beam, to which the clamp assembly will be installed, is also required.

Each side block has at least one opening, but optionally up to 3 or more openings can be provided, and which is or are formed through the leg of the "L" passing between the respective side surface and the inclined wedge surface thereof. The opening or openings, are adapted to receive the bolts, or preferably, a single bolt used to lock the entire clamp assembly together while clamping it securely to the I-beam.

In a preferred embodiment, three openings are provided in the clamp assembly, and a single bolt, through any one of the openings, is used to clamp the assembly together and to the I-beam.

Upon attachment of the clamp assembly to the I-beam so that each respective lower clamping surface of the pair of side blocks faces a respective upper surface of the pair of opposed flanges thereof, and so that the respective inclined wedge surfaces of the side block face respective sloping wedge surfaces of the clamping block, then tightening of the bolt passed through the openings of the side blocks will cause a sliding or wedging action of the sloping wedge surfaces of the clamping block relative to and in opposition to the inclined wedge surfaces of the respective side blocks, so as to secure a clamping action therebetween, and so as to induce a clamping action between the upper surface of the clamping block and the bottom surface of the I-beam to which the clamp assembly is attached.

In operation, the clamping block is in a generally horizontal disposition, and the outer surface thereof is in a generally vertical disposition.

It should be noted that, in general, an opening is formed through the width of the leg of the "T" of the clamping block, so as to pass therethrough from one side to the other, and so as to accommodate the bolt when passed therethrough.

An opening is also provided, preferably at each end of the outer surface of the clamping block, so that a panel can be secured to the clamping block, by passing securing means through the thickness of the panel and through the opening or openings in the clamping block.

An optional second outer face can be provided which is substantially co-planar to the outer surface, and additional openings (such as slots or the like), can be provided on the second outer face. These additional openings are provided so as to allow increased flexibility in attaching the clamping block to the fairing panel, in situations where the I-beams are not all in alignment. This might be the case where the trailer uses I-beams of different depths for additional strength at some parts of the trailer, and thus, the openings provided in the outer surface of the clamping block may not all be in alignment.

There is optionally also a series of corrugations which may be provided on each lower clamping surface of each of the side blocks.

Accordingly, in one aspect, the present invention provides a clamp assembly for securing a panel to an I-beam so that the plane of the panel and the longitudinal axis of the I-beam are substantially perpendicular one to the other, and wherein the clamp is secured to a freely accessible pair of opposed flanges of the I-beam above the bottom surface of said I-beam, comprising:

a pair of side blocks each being generally in the shape on an inverted "L", and each having an upper and outer side surface, and end surfaces, all in mutually perpendicular relationship, a bottom surface parallel to said upper surface, a lower clamping surface parallel to said upper surface, and an inclined wedge surface extending downwardly and outwardly from its intersection with said lower clamping surface to its intersection with said bottom surface;

a single clamping block generally in the shape of a "T", and having an upper surface, an outer surface across the head of the "T" and perpendicular to said upper surface, an inner surface at the foot of the "T" and perpendicular to said upper surface, a bottom surface of the leg of the "T" parallel to said upper surface thereof, and a pair of sloping wedge surfaces along the sides of the leg of the "T", each of which slopes downwardly and inwardly along at least a portion of the length of the leg of the "T" from its respective intersection with said upper surface of the clamping block to a respective intersection with the bottom surface thereof; and a bolt of sufficient length that it is longer than the width of the bottom surface of the I-beam to which said clamp assembly will be installed;

wherein each side block has an opening formed through the leg of the "L" passing between the respective side surface and the inclined wedge surface thereof;

whereby upon attachment of said clamp assembly to an I-beam so that the respective lower clamping surfaces of the pair of side blocks face respective upper surfaces of the pair of opposed flanges at the bottom of said I-beam, and so that the respective inclined wedge surfaces of said side blocks face respective sloping wedge surfaces of said clamping block, a tightening action of said bolt passed through said openings of said side blocks will cause a sliding and wedging action of the sloping wedge surfaces of the clamping block relative to and in opposition to said inclined wedge surfaces of the respective side blocks, so as to thereby secure a clamping action therebetween and so as to induce a clamping action between the upper surface of the clamping block and the bottom surface of the I-beam to which said clamp assembly is attached.

DETAILED DESCRIPTION OF THE INVENTION

In the present application, the term "panel" refers primarily to a cargo trailer fairing, and the present application is primarily directed to this application. However, the skilled artisan will be aware that a clamp assembly for use on an I-beam can be used in a wide variety of applications. Accordingly, while the present application is described with particular reference to the cargo trailer fairing industry, the skilled artisan would be aware that the present application is equally applicable in other applications.

Moreover, it will be noted that in the following discussion, that unless otherwise specifically noted, all of the features described herein may be combined with any of the various aspects described herein, in any combination.

In normal manufacturing of the clamp assembly, typically, each of the side blocks and the clamping block is formed from a plastics material; and the plastics material may be chosen from the group consisting of high-density polypropylene, high-density polyethylene, nylon, vinyl, and polymers, co-polymers, glass or fibre reinforced composite materials, and mixtures thereof. Generally, the side blocks and the clamping block are essentially rigid, meaning that there is little or no compression or flexing of the blocks, in normal use. A preferred material is a thermoplastic olefin (TPO), which is typically a polymer/filler blend usually consisting of some fraction of PP (polypropylene), PE (polyethylene), BCPP (block copolymer polypropylene), rubber, and a reinforcing filler. Common fillers include, though are not restricted to talc, fiberglass, carbon fiber, wollastonite, and MOS (Metal Oxy Sulfate). Common rubbers include EPR (Ethylene propylene rubber), EPDM (EP-diene rubber), EO (ethylene-octene), EB (ethylene-butadiene), SEBS (Styrene-ethylene-butadiene-styrene). One preferred material is a talc-filled thermoplastic elastomer available as Polytrope TPP, or the like.

Use of metal materials, however, for the side and/or clamping blocks, such as iron, steel, or aluminum, is not excluded.

Preferably, a pair of openings is also provided in the inner surface of the foot of the "T" of the clamping block. A planar strap for use in supporting the panel of the fairing, can be attached to the clamping block using these openings. As such, in use, the clamp assembly may optionally further comprise a substantially planar strap which is secured to the inner surface of the foot of the "T" of the clamping block by suitable securing means using the openings in the inner surface of the foot, and wherein the planar strap extends generally downwardly from the inner surface of the foot of the "T" of the clamping block, and can be connected to the bottom of the panel section of the fairing.

Therefore, in one embodiment, the clamp assembly may further also comprise a panel secured to the outer face clamping block, wherein a planar strap is secured at its lower end by securing means to the panel, and secured at its upper end to the foot of the "T" of the clamping block, so that the generally planar strap assumes a curved disposition in a generally "S"-like configuration, when fastened to the foot of the clamping block, and the panel.

The plastics components of the planar strap of the clamp assembly of the present invention may be formed from a plastics material chosen from the group consisting of high-density polypropylene, high-density polyethylene, nylon, vinyl, and polymers, co-polymers, glass or fibre filled composite materials, and mixtures thereof. The planar strap material is chosen so as to be resiliently flexible, while having sufficient rigidity to hold the panel essentially solidly in place in normal use, but provide some ability to flex when the panel is inadvertently contacted with other objects during minor impacts (e.g. striking a curb at low speeds). Moreover, the resilient strap material can assist in pulling the panel back into the proper shape, should it be deflected out of shape.

Accordingly, when the clamp assembly of the present invention is in operation, a plurality of clamp assemblies is secured at the end of a plurality of I-beams at the under surface of a cargo trailer, so as to secure a trailer fairing in place below the sides of the cargo trailer, and thereby so as to improve the aerodynamic properties of the cargo trailer so as to reduce fuel consumption when the cargo trailer is being towed by a suitable road tractor.

Typically, each of the side blocks and the clamping block is injection moulded with a plurality of recesses formed therein so as to create a plurality of ribs therebetween, and thereby so as to increase the rigidity and decrease the weight thereof.

Thus, when the clamp assembly of the present invention is in operation, a plurality of clamp assemblies is secured at the end of a plurality of I-beams at or near the edge of the under surface of a cargo trailer, so as to secure a trailer fairing in-place below the sides of the cargo trailer. The clamp assemblies of the present invention can be rapidly attached to the I-beams preferably using only one bolt, and when in place, the clamp assemblies provide a suitable device for attachment of cargo trailer side fairings, and, thus, provide a rapid method to improve the aerodynamic properties of the cargo trailer, and thus reduce fuel consumption when the cargo trailer is being towed by a suitable road tractor.

It should be noted that the bolts for holding the clamp assembly together, and any other securing means for attaching a planar strap, or a fairing panel, which is employed by the present invention may be made from any material suitable for the intended use. Typically, these materials are chosen from the group consisting of stainless steel, nickel plated steel, zinc plated steel, nylon, titanium, and combinations thereof, although bolts made of plastic or other materials are not excluded.

It should also be noted that the materials of the clamp assembly, and/or the planar straps, and/or the trailer fairing panels themselves, which are employed therewith in keeping with the present invention, are preferably recyclable or re-useable. Plus, at the end of the life of the products, or in the event of damage as a consequence of an accident, the clamp assemblies and the trailer fairings themselves may be recovered for recycling purposes.

Further, it will also be noted that the materials employed in the manufacture of clamp assemblies in keeping with the present invention, as well as the trailer fairings for which their particular purpose is intended, are such that they will withstand extreme temperatures which may range from −60° C. up to +90° C., but more typically, −40 to +60° C.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Figure 1:
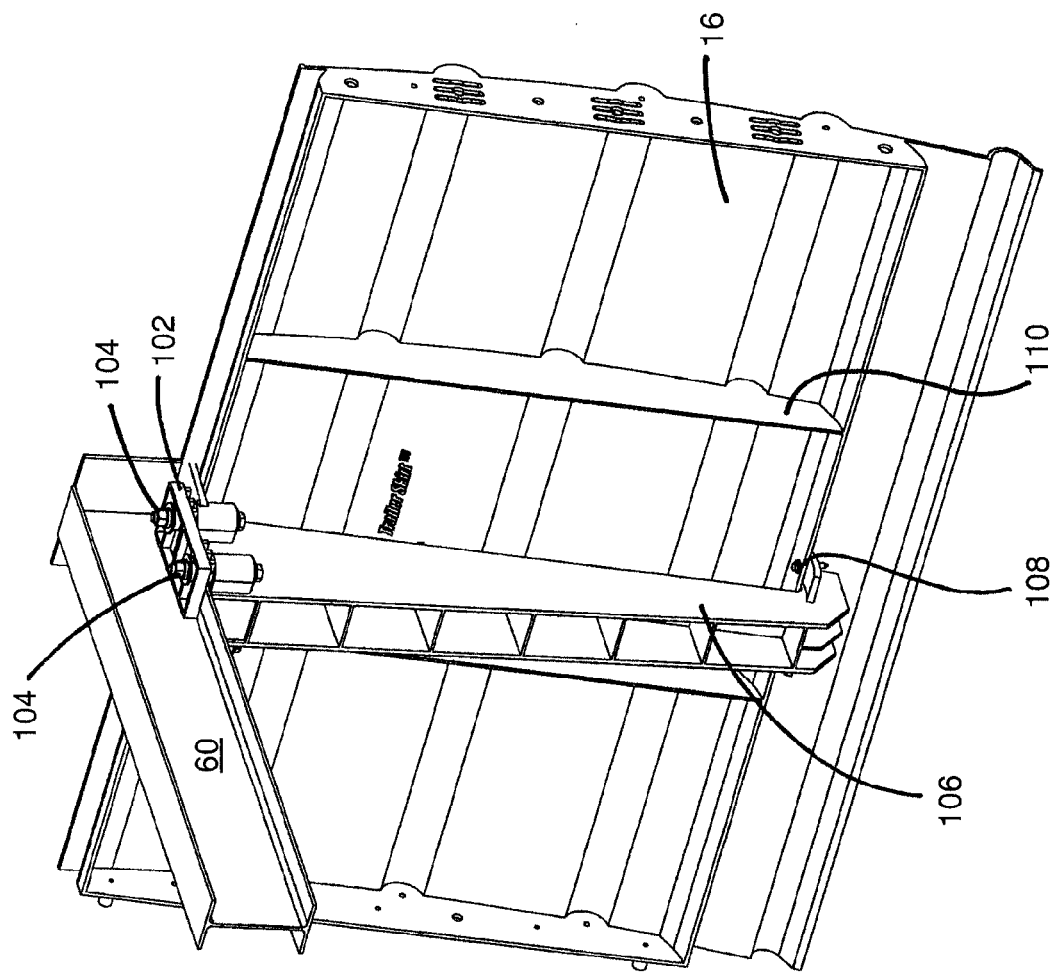
FIG. 1 is a perspective view of the details of a prior art installation of a trailer fairing, in keeping with a prior design.

The novel features which are believed to be characteristic of the present invention, as to its structure, organization, use and method of operation, together with further objectives and advantages thereof, will be better understood from the following discussion. It will be noted that, in the drawings, like reference numerals depict like elements.

Applicant refers first to FIGS. 1, 2, 14, and 15, so as to establish the general environment in which clamp assemblies of the present invention are typically found. Here, the clamp assemblies, both from the prior art and those in keeping with the present invention, are employed to secure trailer fairings beneath the floor of a cargo trailer so as to improve the aerodynamic characteristics thereof. It has been noted the clamp assemblies in keeping with the present invention may find other uses, but the illustrated use is the principal use. In general, a plurality of I-beams 60 are found beneath the floor of a cargo trailer, the floor thereof being secured to the upper horizontal flat portion of the I-beams. Thus, the lower horizontal flat portions of the I-beams are freely accessible, so as to permit securement of other items or devices thereto.

Figure 2:
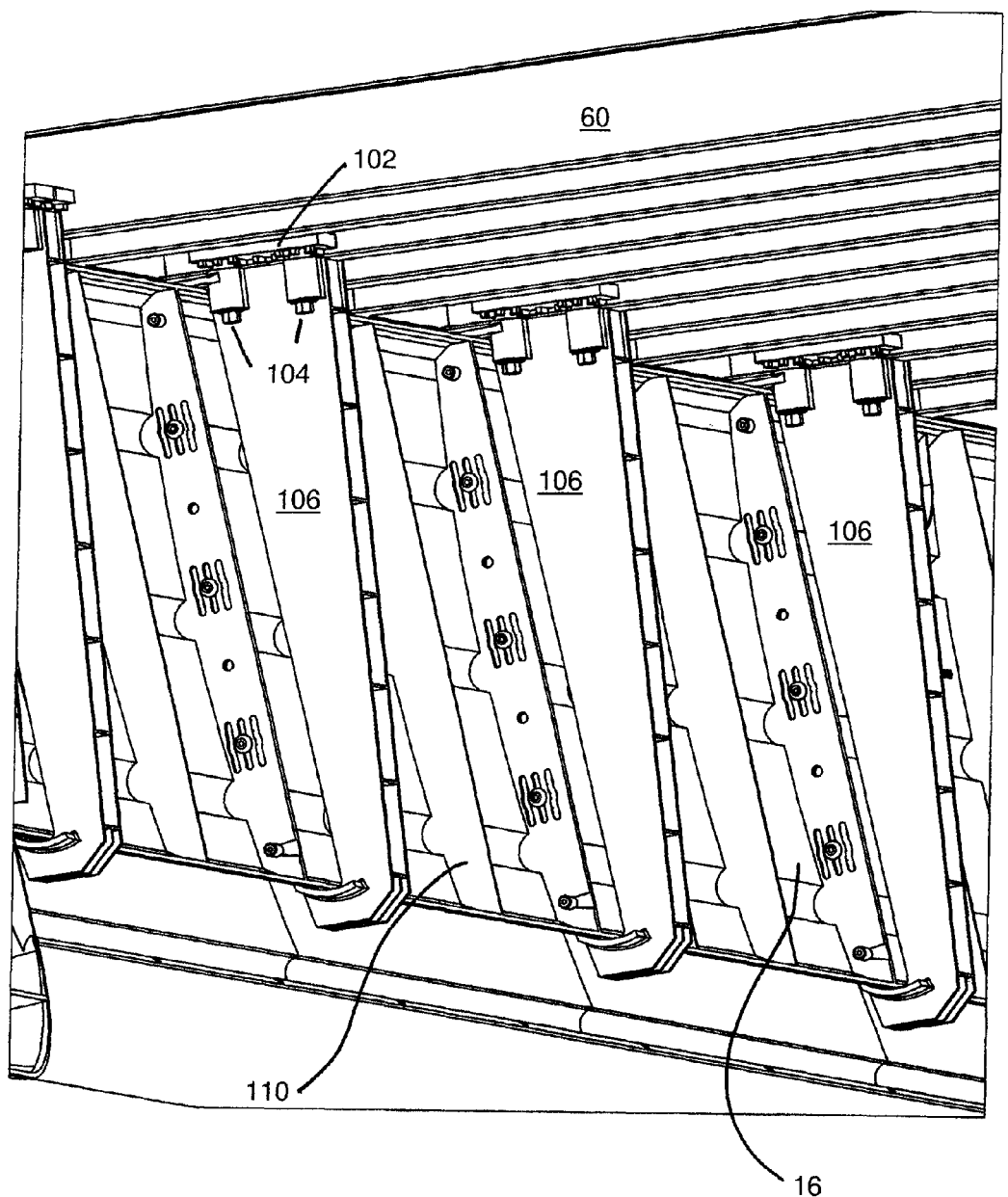
FIG. 2 is a further perspective view of a similar prior art installation as shown in FIG. 1.

A convenient prior art method for mounting trailer fairings to cargo trailers is shown in FIGS. 1 and 2. Here, a moulded trailer fairing 16 is shown being secured to and subtended from the ends of a plurality of I-beams 60. Each mounting assembly has required the use of a plate 102, and a pair of bolts 104, at each side of the I-beams 60, cooperating with the opposed pair of flanges immediately above the bottom surface of each of the I-beams. Cooperating clamping means are associated with struts 106 so as to provide a clamping action of the assembly described immediately above to each I-beam 60. The struts 106 are also secured at the bottom of each of the trailer fairings 16 by suitable securing means 108. For purposes of additional stiffness, stiffening ribs 110 can either be formed in or secured to the trailer fairings 16.

It will be appreciated that effecting the assembly as shown in FIGS. 1 and 2 is labour intensive, and requires a variety of different components. Not only must the assembly of the strut 106 together with the plates 102 and bolts 104 be made at the same time and until some clamping action is achieved, the assembly including the strut 106 must be supported. This may require the services of an additional mechanic; or in any event a certain degree of difficulty is manifested. Thus, the labour costs of installing a trailer fairing 16 may be relatively elevated—although typically not into the range of labour costs that might be encountered in practicing the invention disclosed in the Boivin et al Patent Application Publication.

On the other hand, as will be explained hereafter, the mounting of the clamp assembly 20 in keeping with the present invention is relatively simple, requires manipulation of considerably less weight, and requires in the first instance the placement and tightening of a single bolt to secure the clamp assembly in place at the end of an I-beam. Moreover, the components of the mounting clamp of the present invention utilize a limited number of components, which can be partially pre-assembled prior to use, and utilizes only a small number of standardized, and interchangeable components.

Figure 14:
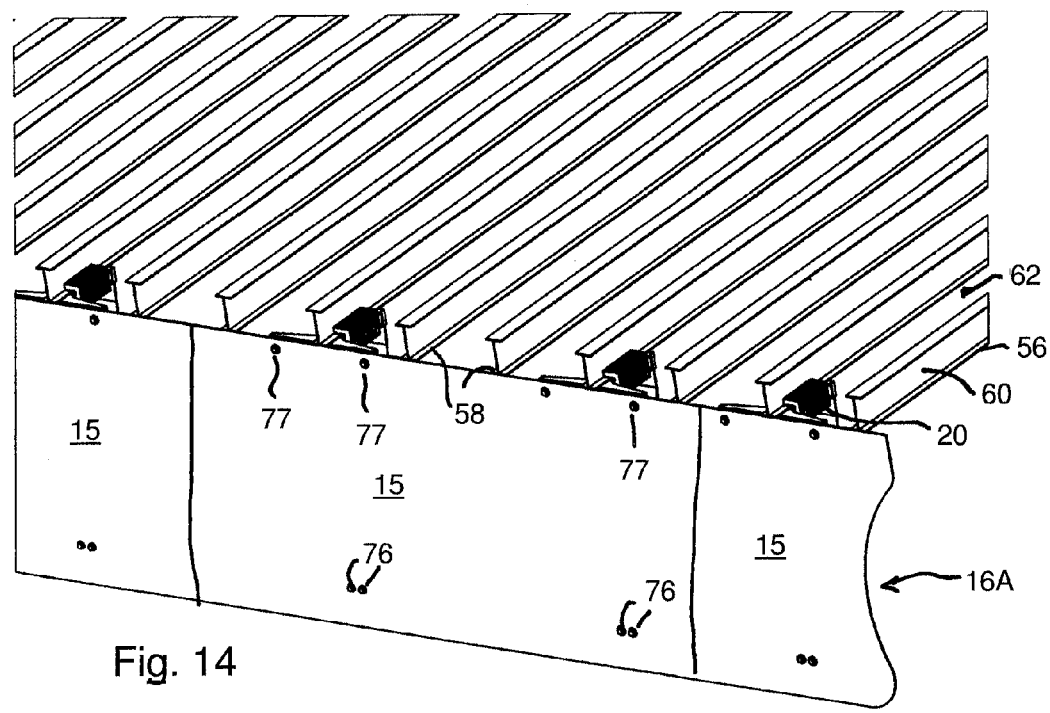
FIG. 14 is a perspective view showing an assembly of a panel or trailer fairing to a plurality of I-beams, in keeping with the purposes of the present invention.
Figure 15:
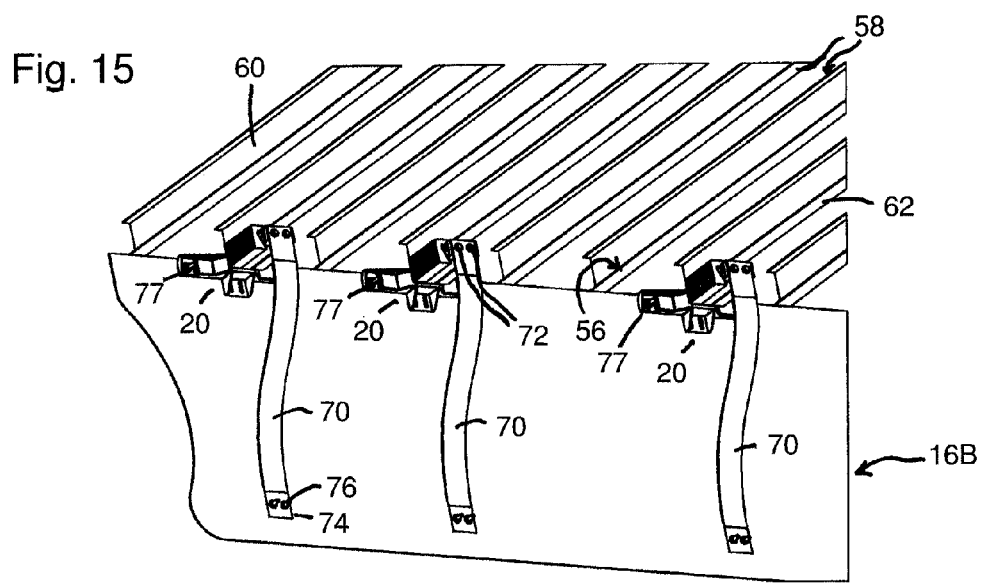
FIG. 15 is a perspective view from below showing an assembly similar to that of FIG. 14.
Figure 16:
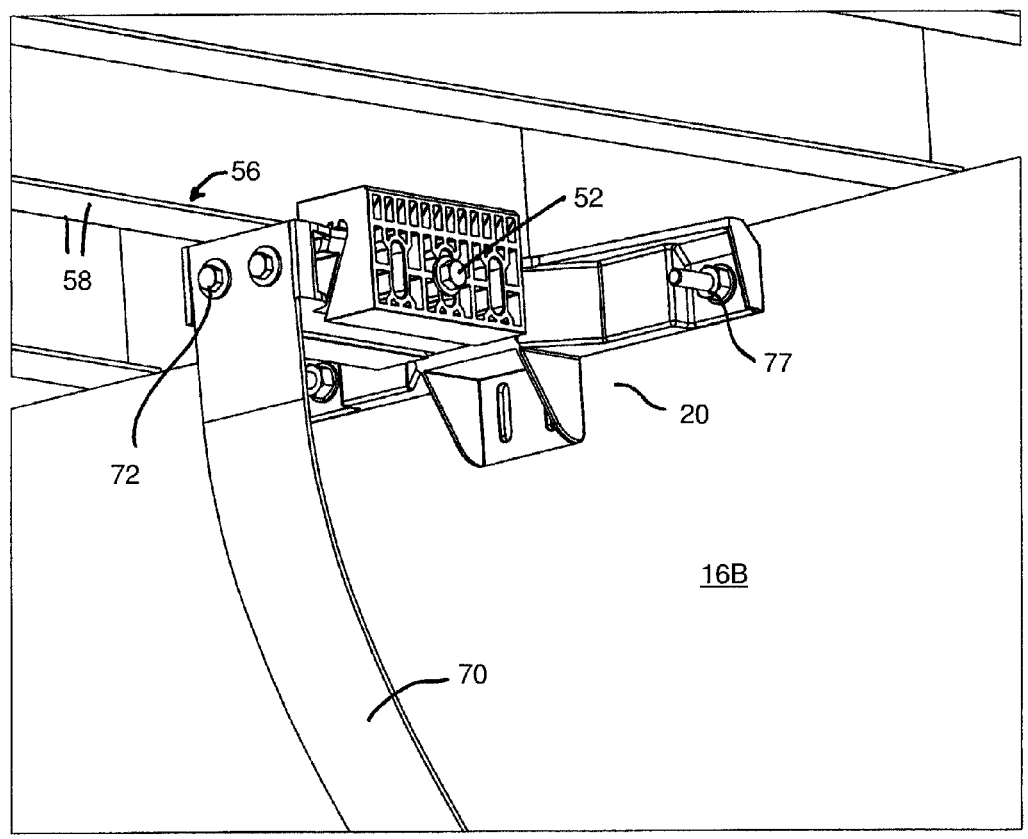
FIG. 16 is a further perspective view in greater detail showing a clamp assembly in keeping with the present invention when installed for its intended purpose.

Indeed, as becomes evident upon inspection of FIGS. 14 and 15, the complete installation of each clamp assembly 20 and a respective strut, or planar support, 70 when secured to a panel 15 or trailer fairing 16, requires the placement and tightening of only a maximum of seven or eight bolts or other securing means, in order to complete the entire task. As such, this task can be easily accomplished in a fairly short period of time by a single mechanic; particularly when clamp assembly 20 is attached to I-beam 60 using only a single bolt. This, of course, is clearly a significant advantage over an assembly such as that shown in FIGS. 1 and 2, which requires significant manipulation of a relatively massive structure; and particularly over an assembly such as that disclosed in the Boivin et al Patent Application Publication, which may require the placement of at least twelve bolts to hold the assembly on an I-beam.

Referring now to FIGS. 9, 10, 11, and 12, it will be seen that the clamp assembly 20 in keeping with the present invention comprises the assembly of three major components. They are a pair of side blocks 22, and a single clamping block 40. When assembled as shown in those figures, it can be appreciated that the assembly is, to all intents and purposes, monolithic. Moreover, as will be described in greater detail hereafter, it is evident that the entire clamp assembly 20 can be effected merely by the placement and tightening of one single bolt 52. It will now also be appreciated, therefore, that placement and then securement of the clamp assembly 20 at the end of an I-beam 60 simply requires that the pieces may either be loosely assembled and put into place, or held or otherwise kept in place while the bolt 52 is put into place.

Figure 3:
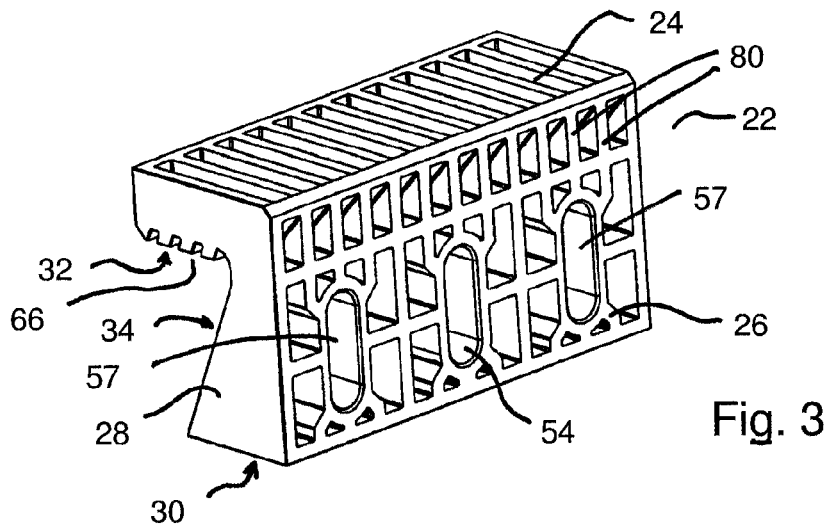
FIG. 3 is a first perspective view of a side block in keeping with the present invention.
Figure 4:
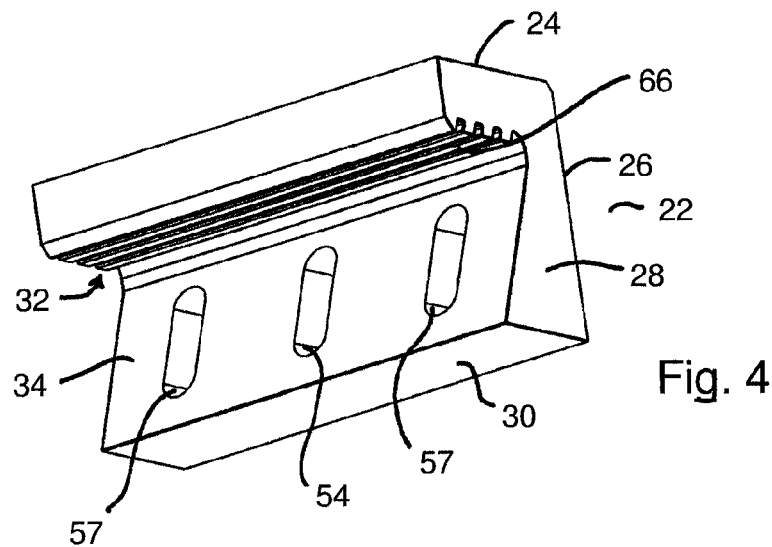
FIG. 4 is a second perspective view of the side block of FIG. 3.
Figure 5:
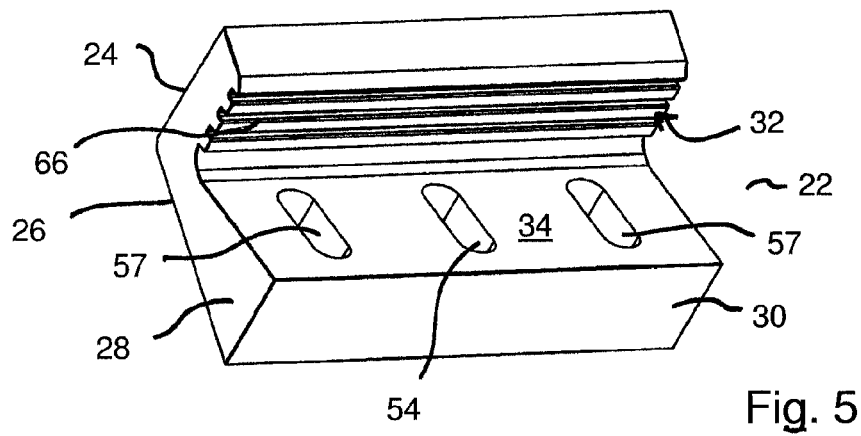
FIG. 5 is a third perspective view of the side block of FIG. 3.

Now, referring to FIGS. 3, 4, and 5, details of the side blocks 22 will be discussed. It is seen that each side block 22 is formed generally in the shape of an inverted "L". Each of the pair of side blocks 22 has an upper surface 24, an outer side surface 26, and end surfaces 28, all of which are in mutually perpendicular relationship one to another. There is a bottom surface 30 which is parallel to the upper surface 24. A lower clamping surface 32 is parallel to the upper surface 24. There is also an inclined wedge surface 34 which extends downwardly and outwardly from its intersection with the lower clamping surface 32, to its intersection with the bottom surface 30. At least one opening 54, and more preferably, at least two other openings 57, are formed through the leg of the "L", and passes through the thickness thereof between the respective side surface 26 and inclined wedge surface 34 of each of the side blocks 22.

Figure 6:
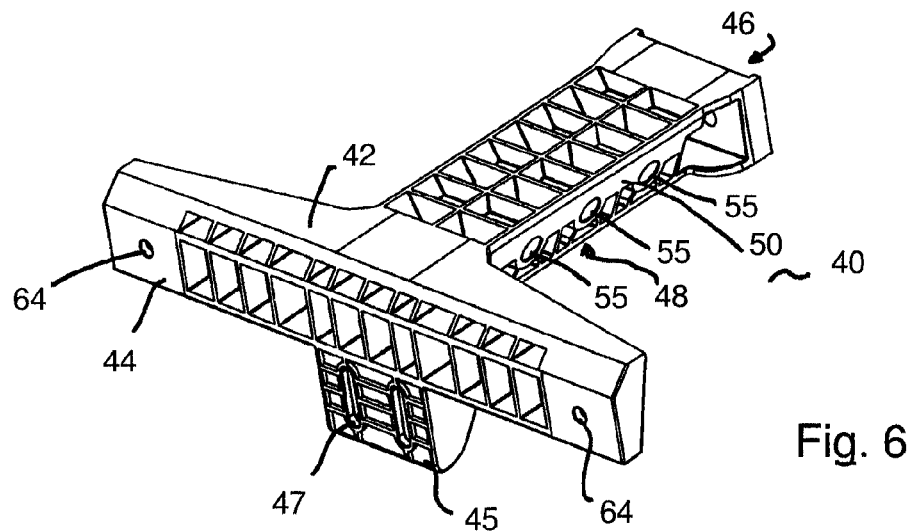
FIG. 6 is a first perspective view of a clamping block in keeping with the present invention.
Figure 7:
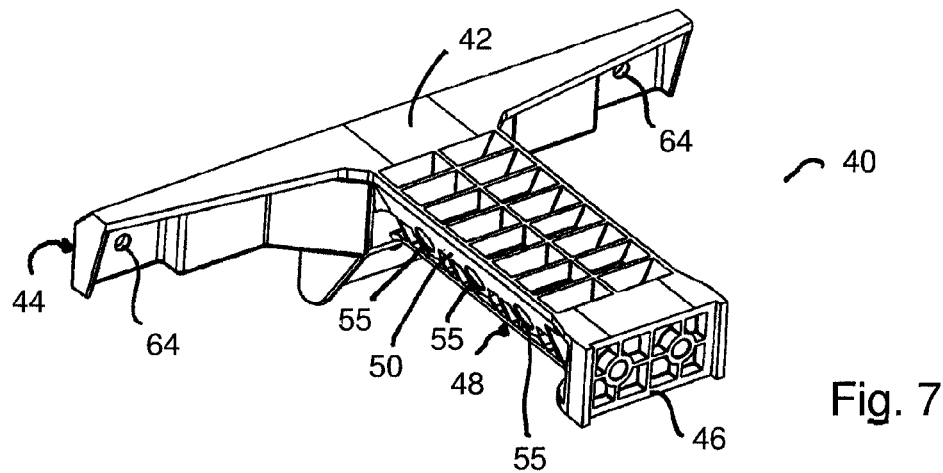
FIG. 7 is a second perspective view of the clamping block of FIG. 6.
Figure 8:
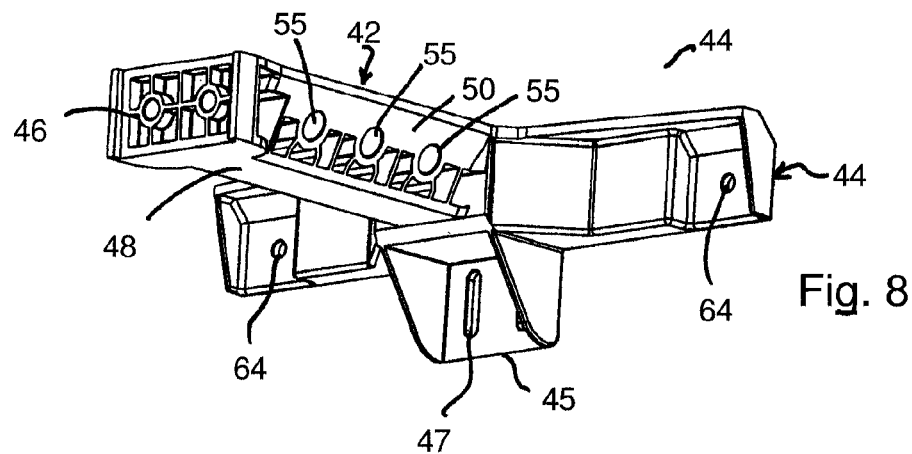
FIG. 8 is a third perspective view of the clamping block of FIG. 6.
Figure 9:
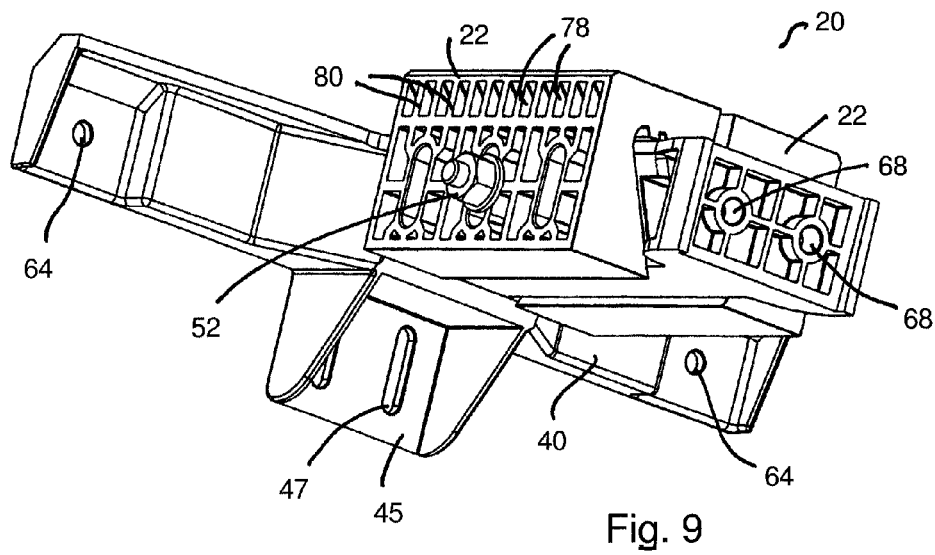
FIG. 9 is a first perspective view of the clamp assembly of the present invention.
Figure 10:
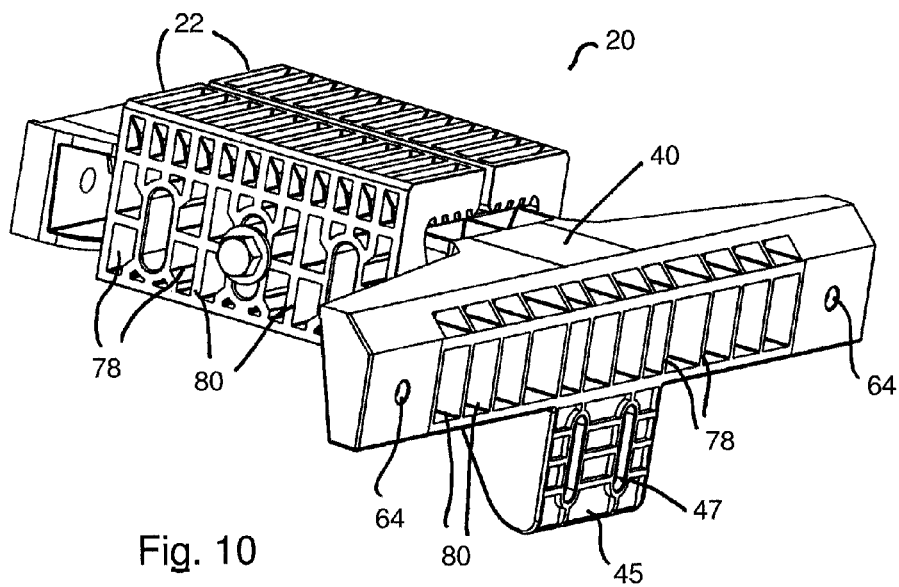
FIG. 10 is a second perspective view of the clamp assembly of the present invention.
Figure 11:
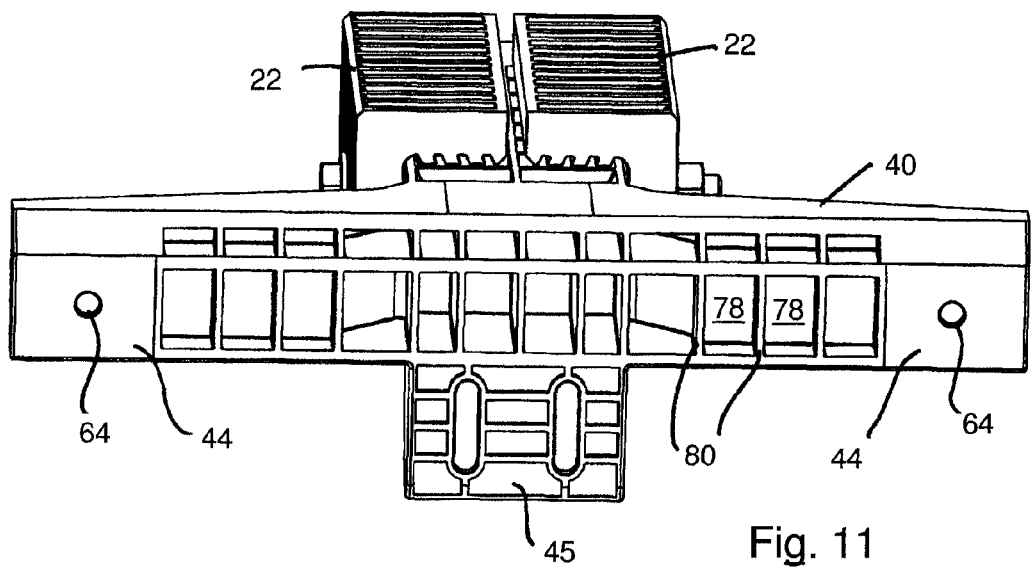
FIG. 11 is a third perspective view of the clamp assembly of the present invention.
Figure 12:
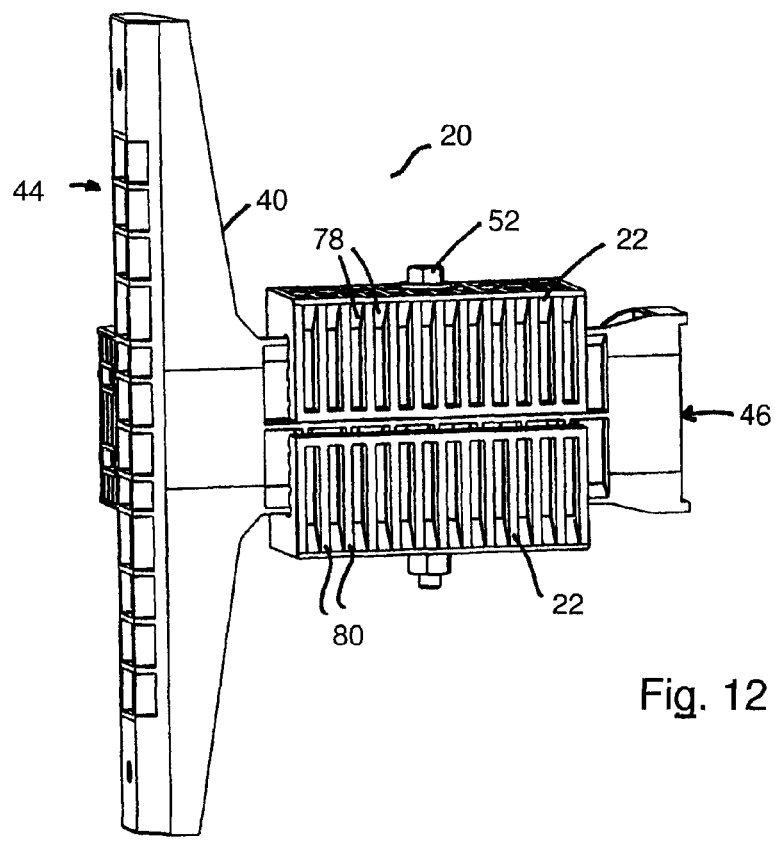
FIG. 12 is an essentially top plan view of the clamp assembly of the present invention.

The clamping block 40 is shown in each of FIGS. 6, 7, and 8. As can be easily seen in each of those figures, in the preferred embodiment of the present invention, the single clamping block 40 is formed generally in the shape of a "T". The upper surface of the clamping block 40 is designated at 42, and an outer surface which extends across the head of the "T" is designated at 44. It is seen that the upper surface 42 and the outer surface 44 are typically, essentially perpendicular one to the other (although this could be varied). There is an inner surface 46 which is at the foot of the "T", and the inner surface 46 is also essentially perpendicular to the upper surface 42. A bottom surface 48 is found at least below the leg of the "T", and is also parallel to the upper surface 42.

The clamping block 40 is particularly characterized by the presence of a pair of sloping wedge surfaces 50 which are preferably formed along at least a portion of the length the sides of the leg of the "T", at the sides thereof. Each sloping wedge surface slopes downwardly and inwardly from its respective intersection with the upper surface 42 up to its respective intersection with the bottom surface 48.

It is possible that the distance or height between the top and bottom surfaces 42 and 48 of the clamping block 40 may be sufficiently small so that the bottom surface 48 is disposed above the bolt 52 when it is in place. However, more typically there is at least one opening 55, and more preferably three openings 55, which are formed through the width of the leg of the "T" of the clamping block, so as to pass therethrough from one side to the other. Any one of the openings 55 is such as to accommodate a bolt 52 when it is passed therethrough.

In any event, when the side blocks 22 and the clamping block 40 are assembled together with the bolt 52, and are placed so that the respective lower clamping surfaces 32 of the pair of side blocks 22 faces a respective upper surface 56 of the pair of opposed flanges 58 of the I-beam, the respective inclined wedge surfaces 34 of the side blocks 22 will face respective sloping wedge surfaces 50 of the clamping block 40. Tightening of the bolt 52 which is passed through a combination of openings 54 and 57 (and preferably 55 when present,) will cause a sliding and wedging action of the sloping wedge surfaces 50 of the clamping block 40 relative to and in opposition to the inclined wedge surfaces 34 of the respective side blocks 22. Thus, a clamping action is secured between the side blocks 22 and through the width of the leg of the "T" of the clamping block 40, which clamping action secures the clamp assembly 20 in place on the opposed lower plate portions of I-beam 60. Still further, a clamping action is induced between the upper surface 42 of the clamping block and the bottom surface 62 of the respective I-beam to which the clamp assembly is attached. In this fashion, I-beams having different widths and thicknesses can be accommodated using clamp assembly 20.

Further, clamping block 40 also optionally additionally includes a second planar face 45 which is essentially co-planar with outer surface 44. Second planar face 45 extends downwardly from block 40, and includes slots, or openings 47, which can be used as additional or replacement attachment points to attach panel 15 to clamping block 40. This is particularly desirable when I-beams 60 of different depths are used, so that openings 64 in adjacent clamping assemblies are not in horizontal alignment. Planar face 45 might also be inwardly inclined away from face 44, if desired.

Figure 13:
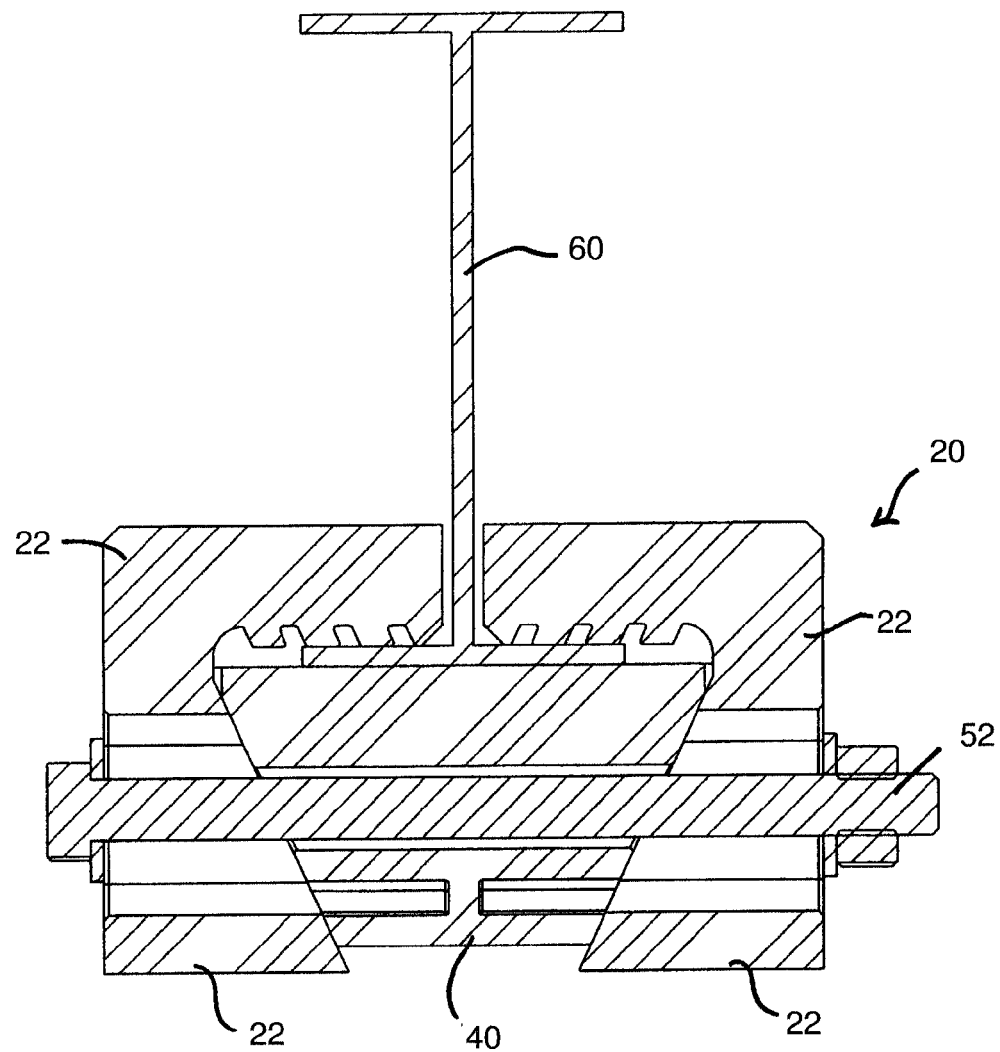
FIG. 13 is a cross-sectional view of a clamp assembly of the present invention attached to an I-beam.

In FIG. 13, a cross sectional view of clamping assembly 20 is shown wherein a single bolt 52 is used to clamp side blocks 22 to clamping block 40, in position on the lower, flat portion of I-beam 60. It can be seen that tightening of bolt 52 caused not only side blocks 22 to clamp against block 40, but the sloping wedge surfaces 50, and the inclined wedge surfaces 34, also cause side blocks 22 to compress against I-beam 60, and thus lock clamping assembly 20 in place.

The inclined wedge surfaces 34, and sloping wedge surfaces 50 preferably are machined so as to have corresponding angles, and thus, be essentially flat and square to one another in use. Typically, the wedge surfaces are at between 15 to 45° relative to a vertical line, and more preferably, between 20 and 30° to a vertical line.

Typically, and as can be appreciated from a cursory inspection of any of FIGS. 13 to 16, the clamping block 40 is disposed in a generally horizontal disposition, and the outer surface 44 (seen in any of FIGS. 6, 7, 11, and 12) is disposed in a generally perpendicular, or nearly perpendicular, disposition.

It will be further understood that the clamp assembly 20 is such that a panel 15 or trailer fairing 16 can be secured to an I-beam in such a manner that the plane of the panel 15 or trailer fairing 16 and the longitudinal axis of each I-beam 60 to which it is attached, are substantially perpendicular one to the other.

A series of corrugations 66 is also preferably formed or provided on each lower clamping surface 32 of each of the side blocks 22. The purpose of these corrugations 66 is provide additional grip on I-beam 60.

It will be appreciated that with the exception of bolts or other securing means, all of the other components of an assembled trailer fairing structure, including the clamp assembly and the fairing itself, are generally formed from plastics material. The materials of the clamp assembly, being the side blocks and the single clamping block, and of the trailer fairings, are generally formed from a thermoplastic or thermoset material which may be chosen from the group consisting of high-density polypropylene, high-density polyethylene, nylon, vinyl, and polymers, co-polymers, glass and fibre filled thermo-composite materials, and mixtures thereof. These materials, including preferred materials such as TPO or TPP, easily lend themselves to thermoforming techniques or injection molding techniques, as is well known to those who are skilled in the art.

Again, however, use of metal or any other suitable materials for any or all of these components is not excluded.

Moreover, the material of the bolts or other securing means is typically stainless steel, but it may be chosen from the group consisting of stainless steel, nickel plated steel, zinc plated steel, nylon, titanium, and combinations thereof.

Referring again to FIGS. 14, 15, and 16, the purposes of the openings 64 and 68 which are formed in the outer surface 44 and the inner surface 46 of the clamping block 40 will be understood more clearly. It can be seen that panels 15 of a modular panel system, forming a fairing 16A (FIG. 14), or alternatively, a single sheet trailer fairing 16B (FIG. 15) may easily be secured to a plurality of clamp assemblies 20 by passing securing means 77 through the thickness of the panel or trailer fairing and through the openings 64.

In general, struts are also installed so as to accommodate some flexibility of the trailer fairing 16, but at the same time so as to maintain the trailer fairing generally in its vertical disposition. Struts in keeping with the present invention typically each comprise a substantially planar strap 70 which is secured to the clamping block 40 at its inner surface 46, at the foot of the "T", by suitable securing means 72 such as bolts, and at the lower ends 74 of the planar straps 70 to the trailer fairing 16 by the use of suitable securing means 76. The planar straps 70 normally have a substantially straight configuration, but it will also be appreciated from FIG. 15 that when the substantially planar straps 70 are secured in place, and connected to clamping assembly 20 and panel 15, they will assume a curved disposition which is in a generally "S"-like configuration.

Figure 17:
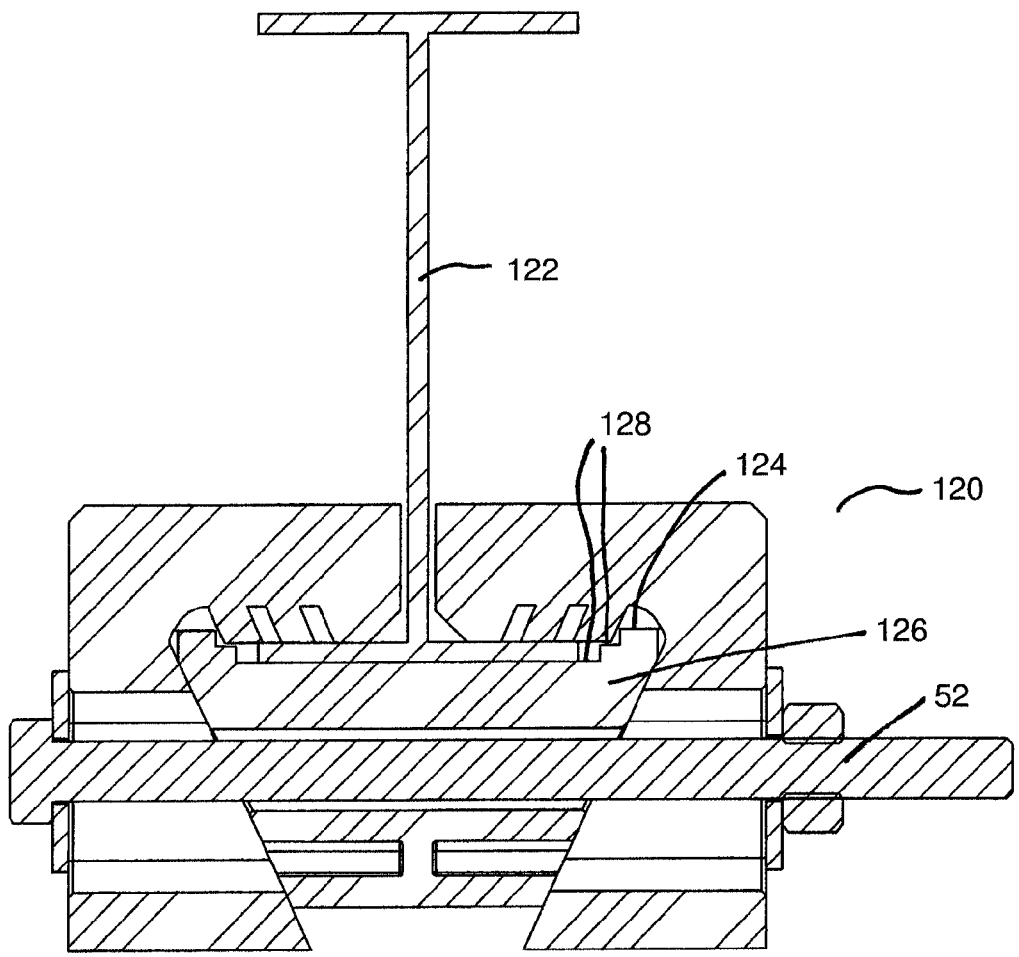
FIG. 17 is a cross-sectional view of a variant of the clamp of the present invention.

In FIG. 17 an alternative embodiment of the clamping assembly 120 is shown in cross section, having a single bolt 52 to hold clamp assembly 120 onto an I-beam 122. A feature of the top surface 124 of clamping block 126, is the presence of a channel 128, preferably having one or two shoulder sections, which channel(s) have widths of between 3 and 10 cm. Since I-beams in trailer applications typically have a width of between 3 and 10 cm, the I-beam will be placed into a suitably sized area within channel 128. In this Figure, the I-beam can be placed within the smallest channel.

By selecting the appropriate channel size, clamp 120 is held firmly on the I-beam and any vibrational twisting force is minimized.

Figure 18:
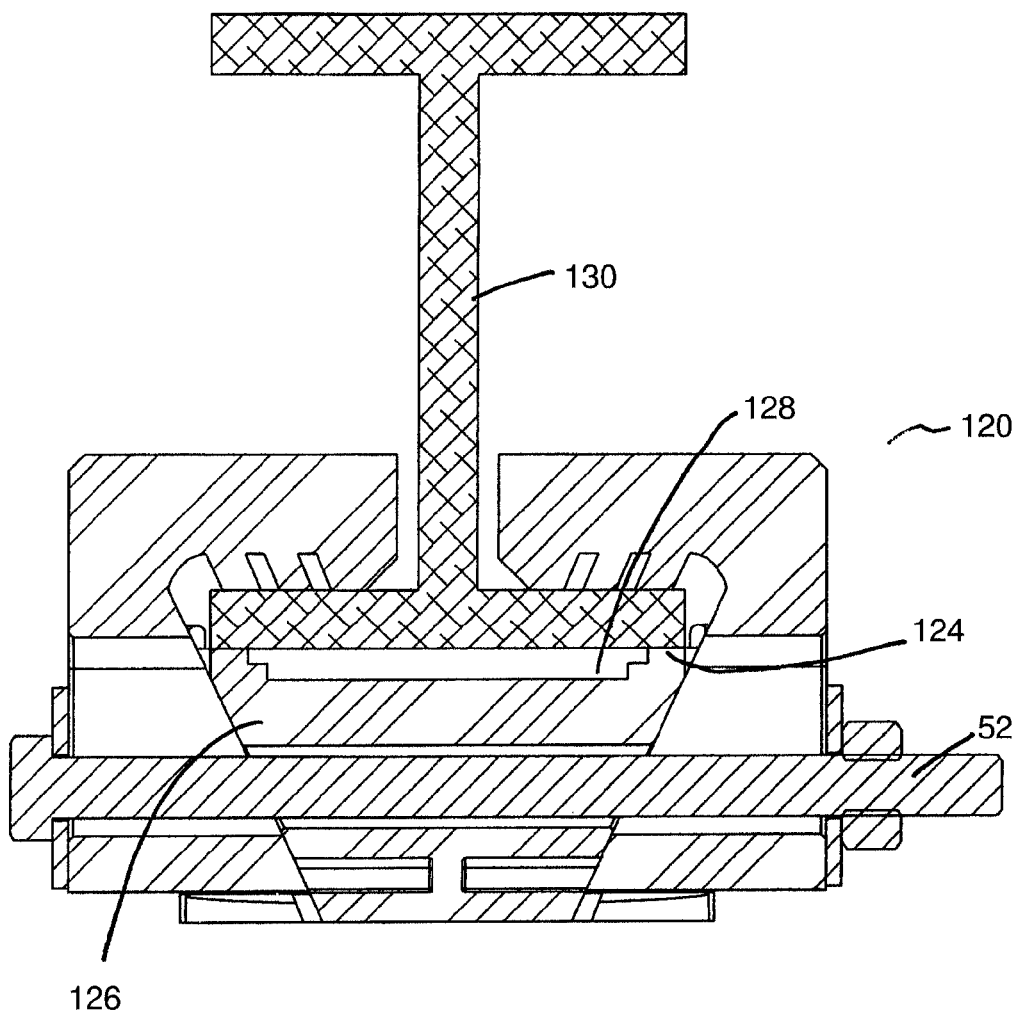
FIG. 18 is a further cross-section view of the variant of FIG. 17, when used with an I-beam having a different width.

In FIG. 18, an I-beam 130 is used having a different, and larger width. As such, it rides on top of clamping block 126. However, it is still held in place in a manner similar to that shown in FIG. 13, for example. Since I-beam 130 is sufficiently large to essentially fill the open area within clamp assembly 120, it is also held tightly in place.

By use of the clamping assembly 120 of FIGS. 17 and 18, the use of more than one bolt to hold the clamping assembly in place, is often not necessary. As such, the present invention also provides an assembly as described hereinabove, wherein a top surface of said clamping block defines one or more longitudinal channel extending along the length of the clamping block from the foot of the "T" to the head of the "T", which channel preferably has shoulder sections to provide channel widths of varying sizes, so that said channel widths are adapted to receive I-beams of various widths.

Figure 19:
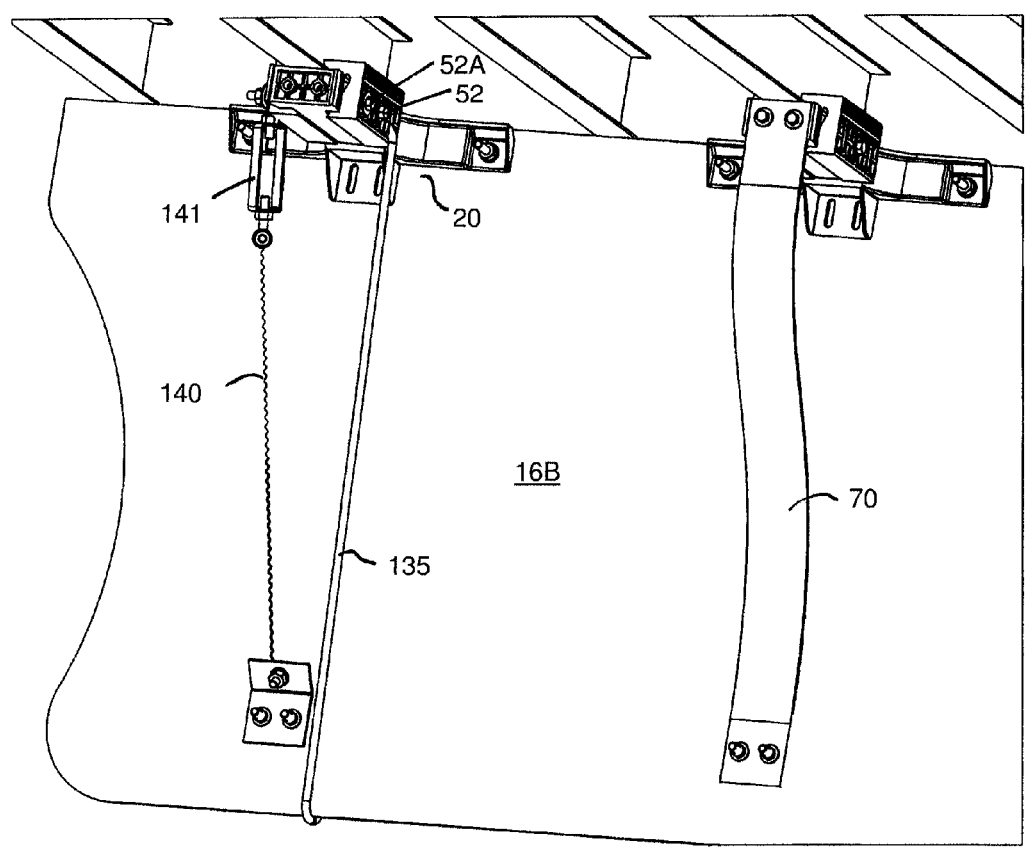
FIG. 19 is a alternative strapping system, and assembly support hook, of use with the clamping assembly of the present invention.

FIG. 19 shows an additional strapping system, in which spring-loaded strap is fitted to the clamping assembly. This is preferably accomplished by using a second bolt 52A which can be inserted through clamping assembly 20, or alternatively which can be attached to the foot of the clamping block, or the like, and thus used to connect spring-loaded strap 140 to clamping assembly 20, using bracket 141. The lower end of strap 140 can be attached to the lower edge of a sheet fairing 16B (or panels 15 of a modular sheet fairing 16A), and assists in holding the panel in place. This also assists in avoiding or minimize deflection of the panel on any inadvertent impact.

A further rigid "hook" 135 can also be temporarily fitted to a suitable opening in clamping assembly 20 (either on the side blocks, the clamping block, or on the side or ends of the clamp assembly) and provides a hook section that can hook around the bottom of panel 16B. Hook 135 can be of particular advantage in the attachment of the fairing to a trailer. In use, an installer attaches a series of hooks 135 to different clamp assemblies 20 fitted to various I-beams. Then, the bottom of panel 16B (or 16A), is inserted into the hook end, and the panel 16B rests against the bar section of hook 135, as seen in FIG. 19. This holds the panel in place while being attached to the clamp assembly 20, and preferably, to strap 70. Typically, two or more hooks 135 are used for each panel to be mounted.

Hooks 135 are preferably formed having a chosen, preselected length so that they will hold panel 16B in the correct position, while the installer completes installation. This installation can include, for example, drilling holes in the panel to fasten them to face 44 or 45. In this manner, even more support for the panel can be provided during installation, and hooks 135 can be removed and reused on the next panel or next installation.

It will now be understood, of course, that clamp assemblies of the present invention, when put into practice, are such that when a plurality of the clamp assemblies is secured at the ends of a plurality of I-beams at the under surface of a cargo trailer, trailer fairing panels may be secured in place below the side of the cargo trailer. Accordingly, as noted above, the aerodynamic properties of the cargo trailer may be significantly improved, so as to reduce fuel consumption of a suitable road tractor towing the cargo trailer by as much as 6.5%.

It will be noted in a number of the figures of drawings, in particular FIGS. 3, 6, 7, 8, 9, 10, 11, and 12, that the side blocks 22 and the clamping block 40 are typically injection moulded having a plurality of recesses 78 formed therein. Accordingly, a plurality of ribs 80 is created between the recesses 78. This manufacturing technique has the advantage that the weight of the injection moulded side blocks 22 and clamping block 40 will be reduced, while at the same time their rigidity in a direction parallel to the respective ribs will be increased.

Thus, it is apparent that there has been provided, in accordance with the present invention, a clamping assembly which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Thus, the word "comprise", and variations such "comprises" or "comprising", will be understood to imply the inclusion of a stated integer or step or group of integers or steps, but not to the exclusion of any other integer or step or group of integers or steps.

Further, the invention illustratively disclosed herein suitably may be practiced in the absence of any element which is not specifically disclosed herein.

Moreover, the words "substantially", "essentially", "typically", "generally" or the like, when used with an adjective or adverb is intended to enhance the scope of the particular characteristic; e.g., "substantially planar" is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

Other modifications and alterations may be used in the design and manufacture of the apparatus of the present invention without departing from the spirit and scope of the accompanying claims.

We claim:

1. A trailer fairing clamping system comprising a plurality of clamp assemblies wherein each clamp assembly of said clamp assemblies is secured at the ends of a plurality of I-beams on the under surface of a cargo trailer to secure said trailer fairing in-place below the sides of said cargo trailer and improve aerodynamic properties of said cargo trailer and reduce fuel consumption when said cargo trailer is being towed by a road tractor, wherein each clamp assembly can be used to secure a panel to said I-beam so that the plane of the panel and the longitudinal axis of the I-beam will be substantially perpendicular one to the other, and wherein said clamp assembly can be secured to a freely accessible pair of opposed flanges of the I-beam above the bottom surface of said I-beam, wherein each of said clamp assemblies comprises:

a pair of side blocks each having a lower clamping surface and an inclined wedge surface which wedge surface extends from an intersection with said lower clamping surface;

a single clamping block having an upper surface, an outer surface perpendicular to said upper surface, a bottom surface, and a pair of sloping wedge surfaces along the sides of the said clamping block, each of which slopes along at least a portion of the length of the clamping block from a respective intersection with said upper surface of the clamping block to a respective intersection with the bottom surface thereof; and at least one bolt;

wherein each side block has at least one opening formed through a side surface and the inclined wedge surface thereof;

whereby upon attachment of said clamp assembly to said I-beam, the respective lower clamping surfaces of the pair of side blocks will face respective upper surfaces of the pair of opposed flanges at the bottom of said I-beam, and so that the respective inclined wedge surfaces of said side blocks will face respective sloping wedge surfaces of said clamping block, so that a tightening action of said at least one bolt passed through said openings of said side blocks will cause a sliding and wedging action of the sloping wedge surfaces of the clamping block relative to and in opposition to said inclined wedge surfaces of the respective side blocks, so as to thereby secure a clamping action therebetween and a clamping action will be induced between the upper surface of the clamping block and the bottom surface of the I-beam, and wherein, in operation, said clamping block is in a generally horizontal disposition, and said outer surface thereof is in a generally vertical disposition.

2. The trailer fairing clamping system according to claim 1, wherein an opening is formed through the width of the clamping block, so as to pass therethrough from one side to the other, and so as to accommodate said at least one bolt when passed therethrough.

3. The trailer fairing clamping system according to claim 1, wherein an opening is provided on said clamping block so that a panel can be secured to said clamping assembly by passing a securing means through the thickness of the panel and through said openings in the clamping block.

4. The trailer fairing clamping system according to claim 3, wherein each of said bolt and said securing means is made from a material chosen from the group consisting of stainless steel, nickel plated steel, zinc plated steel, nylon, titanium, and combinations thereof.

5. The trailer fairing clamping system according to claim 1, wherein a series of corrugations is provided on the lower clamping surface of each of said side blocks.

6. The trailer fairing clamping system according to claim 1, wherein each of said side blocks and said clamping block is formed from a plastics material.

7. The trailer fairing clamping system according to claim 6, wherein said plastics material is chosen from the group consisting of TPO, TPP, high-density polypropylene, high-density polyethylene, nylon, vinyl, and polymers, co-polymers, glass or fibre filled composite materials, thermocomposite materials, and mixtures thereof.

8. The trailer fairing clamping system according to claim 7, wherein each of said side blocks and said clamping block is injection moulded with a plurality of recesses formed therein so as to create a plurality of ribs between said recesses, and thereby so as to increase the rigidity and decrease the weight thereof.

9. The trailer fairing clamping system according to claim 1, further comprising a strut for attaching said clamp assembly to said panel.

10. The trailer fairing clamping system according to claim 9, wherein said strut is attached to said clamping block.

11. The trailer fairing clamping system according to claim 9, wherein said strut is a substantially planar strap secured to said clamping block.

12. The trailer fairing clamping system according to claim 9, wherein said strut is formed from a plastics material chosen from the group consisting of high-density polypropylene, high-density polyethylene, nylon, vinyl, and polymers, co-polymers, glass and fibre filled composite materials, and mixtures thereof.

13. The trailer fairing clamping system according to claim 9, wherein each of said panel and said strut is formed from a plastics material chosen from the group consisting of TPO, TPP, high-density polypropylene, high-density polyethylene, nylon, vinyl, and polymers, co-polymers, and mixtures thereof.

14. The trailer fairing clamping system according to claim 9, further comprising a spring-loaded strap secured to said clamp assembly, wherein said spring loaded strap extends generally downwardly from said clamp assembly.

15. The trailer fairing clamping system according to claim 1 wherein said at least one bolt has a length which is longer that the width of the bottom surface of said I-beam.

16. The trailer fairing clamping system according to claim 1, wherein a top surface of said clamping block defines one or more longitudinal channels extending along the length of the clamping block and wherein said channel is adapted to receive I-beams of various widths.

17. The trailer fairing clamping system according to claim 16, wherein said channel has shoulder sections to provide channel widths of varying sizes.

18. A trailer fairing clamping system comprising a plurality of clamp assemblies wherein each clamp assembly of said clamp assemblies is secured at the ends of a plurality of I-beams on the under surface of a cargo trailer to secure said trailer fairing in-place below the sides of said cargo trailer and improve the aerodynamic properties of said cargo trailer and reduce fuel consumption when said cargo trailer is being towed by a road tractor, wherein each clamp assembly can be used to secure a panel to said I-beam so that the plane of the panel and the longitudinal axis of the I-beam will be substantially perpendicular one to the other, and wherein said clamp assembly can be secured to a freely accessible pair of opposed flanges of the I-beam above the bottom surface of said I-beam, wherein each of said clamp assemblies comprises:
  a pair of side blocks each having a lower clamping surface and an inclined wedge surface which wedge surface extends from an intersection with said lower clamping surface;
  a single clamping block having an upper surface, an outer surface perpendicular to said upper surface, a bottom surface, and a pair of sloping wedge surfaces along the sides of the said clamping block, each of which slopes along at least a portion of the length of the clamping block from a respective intersection with said upper surface of the clamping block to a respective intersection with the bottom surface thereof;
  a strut for attaching said clamp assembly to said panel; and
  at least one bolt;
  wherein each side block has at least one opening formed through a side surface and the inclined wedge surface thereof;
  whereby upon attachment of said clamp assembly to said I-beam, the respective lower clamping surfaces of the pair of side blocks will face respective upper surfaces of the pair of opposed flanges at the bottom of said I-beam, and so that the respective inclined wedge surfaces of said side blocks will face respective sloping wedge surfaces of said clamping block, so that a tightening action of said at least one bolt passed through said openings of said side blocks will cause a sliding and wedging action of the sloping wedge surfaces of the clamping block relative to and in opposition to said inclined wedge surfaces of the respective side blocks, so as to thereby secure a clamping action therebetween and thereby a clamping action will be induced between the upper surface of the clamping block and the bottom surface of the I-beam.

19. The trailer fairing clamping system according to claim 18, wherein each of said side blocks, said strut, and said clamping block is formed from a plastics material.

20. The trailer fairing clamping system according to claim 19, wherein said plastics material is chosen from the group consisting of TPO, TPP, high-density polypropylene, high-density polyethylene, nylon, vinyl, and polymers, co-polymers, glass or fibre filled composite materials, thermocomposite materials, and mixtures thereof.

21. The trailer fairing clamping system according to claim 18, wherein each of said side blocks, said strut, and said clamping block is injection moulded with a plurality of recesses formed therein so as to create a plurality of ribs between said recesses, and thereby so as to increase the rigidity and decrease the weight thereof.

22. The trailer fairing clamping system according to claim 18, further comprising a spring-loaded strap secured to said clamp assembly, wherein said spring loaded strap extends generally downwardly from said clamp assembly.

23. The trailer fairing clamping system according to claim 18, wherein a top surface of said clamping block defines one or more longitudinal channels extending along the length of the clamping block and wherein said channel is adapted to receive I-beams of various widths.

24. The trailer fairing clamping system according to claim 23, wherein said channel has shoulder sections to provide channel widths of varying sizes.

* * * * *

UNITED STATES PATENT AND TRADEMARK OFFICE
CERTIFICATE OF CORRECTION

PATENT NO.         : 9,506,488 B2
APPLICATION NO.    : 14/083472
DATED              : November 29, 2016
INVENTOR(S)        : Joseph Mancina et al.

Page 1 of 1

It is certified that error appears in the above-identified patent and that said Letters Patent is hereby corrected as shown below:

On the Title Page

Column 1, Item (73): Please delete "LAYDO" and insert --LAYDON-- therefor

Signed and Sealed this
Twenty-third Day of May, 2017

Michelle K. Lee
*Director of the United States Patent and Trademark Office*